United States Patent
Miyashita

(10) Patent No.: US 6,860,613 B2
(45) Date of Patent: Mar. 1, 2005

(54) LIGHTING PANEL DEVICE FOR ILLUMINATION OF AN OBJECT

(75) Inventor: Junji Miyashita, Yamanashi-ken (JP)

(73) Assignee: Citizen Electronics Co., Ltd., Yamanashi-ken (JP)

(*) Notice: Subject to any disclaimer, the term of this patent is extended or adjusted under 35 U.S.C. 154(b) by 116 days.

(21) Appl. No.: 10/214,590

(22) Filed: Aug. 9, 2002

(65) Prior Publication Data

US 2003/0031007 A1 Feb. 13, 2003

(30) Foreign Application Priority Data

Aug. 13, 2001 (JP) ........................................ 2001-245753

(51) Int. Cl.[7] ................................................ F21V 7/04
(52) U.S. Cl. ............................ 362/31; 362/26; 362/330; 362/339
(58) Field of Search ........................... 362/31, 330, 339, 362/26, 337, 560, 561; 385/146, 123, 901, 50

(56) References Cited

U.S. PATENT DOCUMENTS

| 5,600,462 A | | 2/1997 | Suzuki et al. ............... 349/112 |
| 6,118,503 A | * | 9/2000 | Oki et al. ..................... 362/31 |
| 6,334,690 B1 | * | 1/2002 | Ohkawa ........................ 362/31 |

FOREIGN PATENT DOCUMENTS

| JP | 9 178914 | 7/1997 |
| JP | 11-119012 | 4/1999 |

* cited by examiner

Primary Examiner—Thomas M. Sember
Assistant Examiner—Bao Q. Truong
(74) Attorney, Agent, or Firm—Dennison, Schultz, Dougherty & MacDonald

(57) ABSTRACT

A lighting panel device has a light source, a lighting panel receiving light from the light source at an end face, and a prism sheet provided above the lighting panel. The lighting panel has a bottom reflector face, and the prism sheet has a plurality of prisms arranged in a longitudinal direction of the prism sheet. Each of the prisms has a sectional shape of a triangle. A vertex of the triangle is between 30° and 25°.

1 Claim, 3 Drawing Sheets

LIGHTING PANEL DEVICE FOR ILLUMINATION OF AN OBJECT

BACKGROUND OF THE INVENTION

The present invention relates to a lighting panel device for illuminating a wide face such as a liquid crystal display.

A wide lighting panel device used as a front light or a back light for the liquid crystal display is well known. The lighting panel device comprises a light source, a lighting panel for introducing the light emitted from the light source at an end face of the plate, and a prism sheet disposed to face the lighting panel for radiating the light discharged from the lighting panel to an object.

FIG. 7 is a side view showing a conventional lighting panel device used as a back light of a liquid crystal display (hereinafter called LCD). The lighting panel device 20 comprises a light source 21 comprising a light emitting diode (LED), a lighting panel 22, a light diffusion sheet 23 opposite the front side of the lighting panel 22, a reflection sheet 26, a pair of prism sheets 24 and 25 each having a plurality of prisms 24a (25a). The prism 24a of the sheet 24 and prism 25a of the sheet are different from each other in prism extending direction. There is a difference of 90 degrees between both directions.

Referring to FIG. 8, the light rays emitted from the light source 21 enters the lighting panel 22 from an end face 22a and is reflected by a bottom saw teeth reflector face 22b. A light A discharges from the lighting panel 22 at a refraction angle θ with respect to a normal N. A light B is further reflected by an upper face 22c and bottom reflector 22b, and discharges from the lighting panel 22. A light C is discharged after repeatedly reflected in the lighting panel 22.

Light discharged from the lighting panel 22 is diffused by the diffusion sheet 23 and enters prism sheets 24 and 25. The light is refracted by prisms 24a and 25a and discharged from the prism sheets 24 and 25, arranged in parallel rays. The light emitted from the prism sheet 25 illuminates an LCD (not show).

The refraction angle θ is about 60°–80°, and the vertex of the prism 24 (25) is 90°.

FIG. 9 shows locus of light drawn by computer simulation of another conventional lighting panel device. In the device, the prism sheet 25 and diffusion sheet 23 are omitted. As shown in the drawing, the incidence angle of the light projected into an LCD 27 is large. The incidence angle is about 35°–40°. Such a large incidence angle may cause reflection of incident light, so that the illumination efficiency for the LCD reduces.

SUMMARY OF THE INVENTION

An object of the present invention is to provide a lighting device which may efficiently illuminate an object.

According to the present invention, there is provided a lighting panel device comprising a light source, a lighting panel receiving light from the light source at an end face, the lighting panel having a bottom reflector face, a prism sheet provided above the lighting panel, the prism sheet having a plurality of prisms arranged in a longitudinal direction of the prism sheet, each of the prisms having a sectional shape of a triangle and projecting perpendicularly from the prism sheet, and a vertex of the triangle being between 30° and 25°.

The triangle is an isosceles triangle.

The bottom reflector face comprises a saw teeth reflector face.

These and other objects and features of the present invention will become more apparent from the following detailed description with reference to the accompanying drawings.

DETAILED DESCRIPTION OF THE PREFERRED EMBODIMENT

Figure 1:
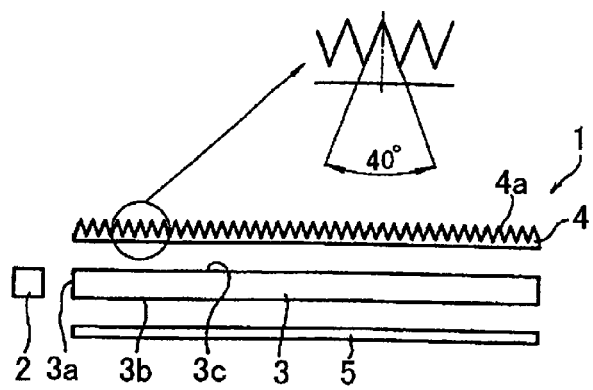
FIG. 1 is a side view showing a lighting panel device of the present invention.

Referring to FIG. 1, a lighting panel device 1 of the present invention is used as a back light of the LCD. The lighting panel device 1 comprises a lighting panel 3, a light source 2 comprising an LED disposed opposite an end face 3a of the lighting panel 3 as an edge light, a prism sheet 4 opposite an upper surface of the lighting panel 3, and a reflector plate 5 opposite an underside of the lighting panel 3.

Figure 8:
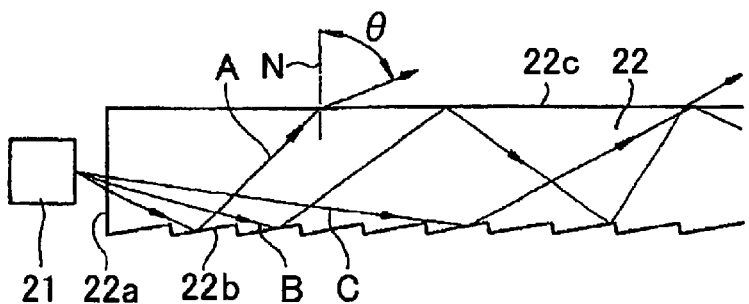
FIG. 8 is an enlarged view of a part of FIG. 7.
Figure 9:
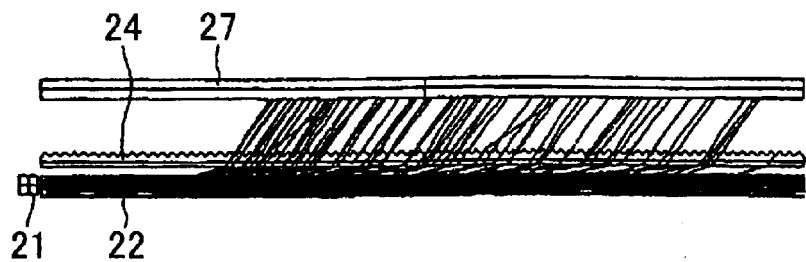
FIG. 9 shows loci drawn by computer simulation.

The lighting panel 3 has the same construction as the lighting panel 22 of FIG. 8. Namely each tooth of the bottom saw teeth reflector face 22b has a triangular section comprising a first oblique side at a light introducing side and a second oblique side behind the first oblique side and having a shorter length than that of the first oblique side.

The prism sheet 4 has a plurality of prism 4a arranged in the longitudinal direction of the sheet at the light discharge side. Each of the prisms 4a extends in the lateral direction of the prism sheet 4 and has a sectional shape of an isosceles triangle. The triangle is perpendicularly projected from the prism sheet 4.

Light emitted from the light source 2 is projected into the end face 3a of the lighting panel 3 and reflected by bottom saw teeth reflector face 3b and an upper reflector face 3c and discharges from the upper surface of the lighting panel 3, refracting at the upper surface. Light discharged from the bottom face 3b is reflected by the reflector sheet 5.

Light emitted from the lighting panel 3 is projected into the prism sheet 4, and refracted by the prism 4a. The prism has a vertex smaller than 40°, and preferably has a vertex between 30° and 25°.

By setting the vertex to such an angle, the light emitted from the prism sheet 4 strikes the underside of an LCD at a very small incidence angle of about 90 degrees.

Figure 2:
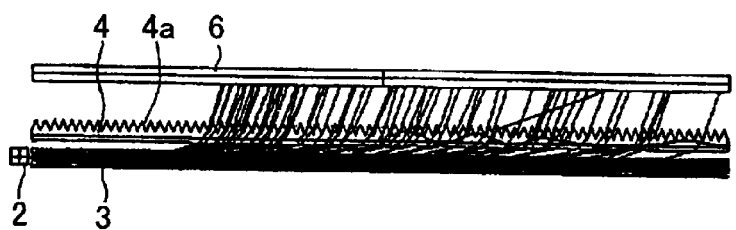
FIGS. 2 through 4 show loci drawn by computer simulation.
Figure 3:
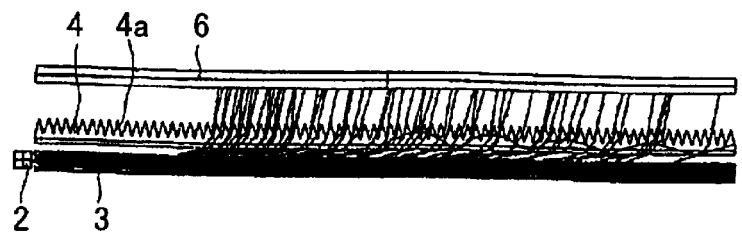
Figure 4:
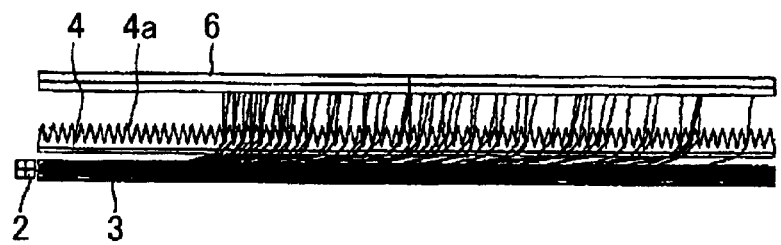

FIG. 2 shows an illuminating state of light projected from the prism sheet 4 having a prism vertex of 40°, FIG. 3 shows a state of a vertex of 30°, and FIG. 4 shows a state of a vertex of 25°. As shown in the drawings, an incidence angle of light with respect to the underside of an LCD 6 reduces as the vertex of the prism becomes small, so that the illumination efficiency increases. However, it is difficult to manufacture accurately a large amount of prism sheets each having a prism of a small vertex. Therefore, it is preferably that the vertex of the prism is smaller than 40°, preferably between 30° and 25°.

Figure 5:
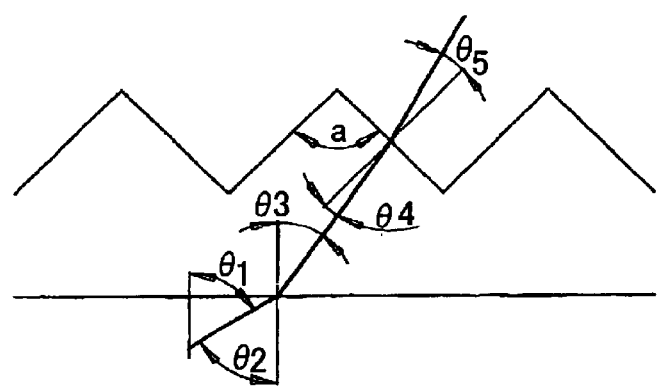
FIGS. 5 and 6 show the relationship between a vertex of a prism and a refraction angle.
Figure 6:
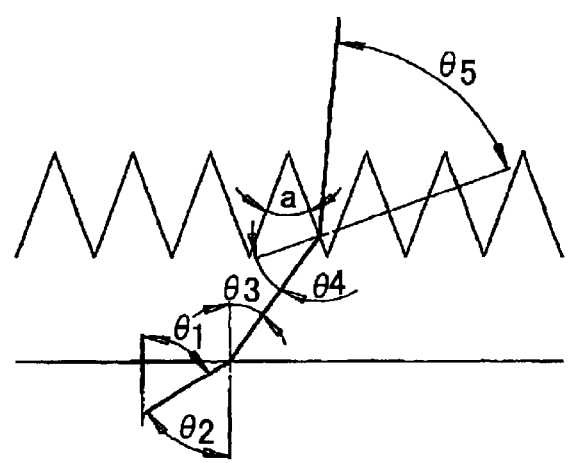
Figure 7:
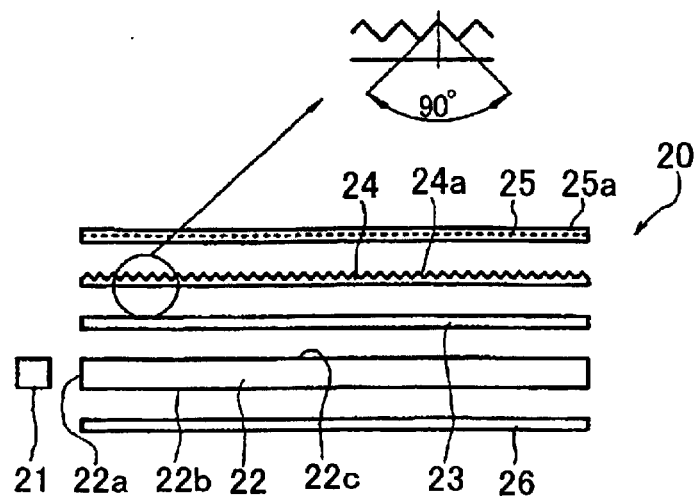
FIG. 7 is a side view showing a conventional lighting panel.

FIGS. 5 and 6 show the relationship between the vertex of the prism and the refraction angle. In the prism having a large vertex shown in FIG. 5, the incidence angle θ4 and the refraction angle θ5 are small. To the contrary, in the small vertex shown in FIG. 6, the incidence angle θ4 and the refraction angle θ5 are large, thereby reducing the incidence angle to the LCD.

In accordance with the present invention, the incidence angle of light applied to an object is reduced, thereby increasing illumination efficiency.

While the invention has been described in conjunction with preferred specific embodiment thereof, it will be understood that this description is intended to illustrate and not limit the scope of the invention, which is defined by the following claims.

What is claimed is:

1. A lighting panel device comprising:

a light source;

a lighting panel receiving light from the light source at an end face thereof, the lighting panel having a bottom reflector face which comprises a saw teeth reflector face;

a reflector plate provided under the lighting panel; and a prism sheet provided above the lighting panel, the prism sheet having a plurality of prisms formed on a light discharge side of the prism sheet disposed away from the lighting panel, and arranged in a longitudinal direction and extended in a lateral direction of the prism sheet, each of the prisms having a sectional shape of an isosceles triangle and projecting perpendicularly from the prism sheet, thereby refracting discharge light, the isosceles triangle having a vertex angle of between 30° and 25°.

* * * * *